Jan. 1, 1935.  E. E. CARLSON  1,986,555

KNEE REST

Filed Oct. 30, 1933  2 Sheets-Sheet 1

Witnesses.
James F. Koca.

Inventor.
Elmer E. Carlson.

Jan. 1, 1935.    E. E. CARLSON    1,986,555
KNEE REST
Filed Oct. 30, 1933    2 Sheets-Sheet 2
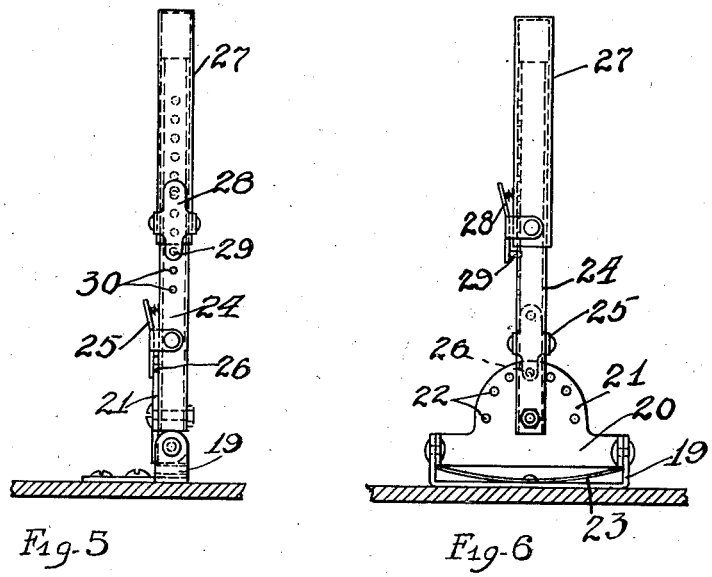
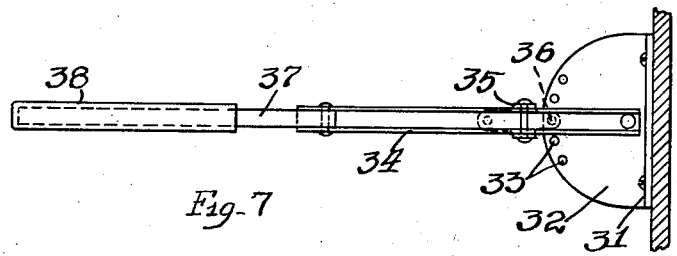
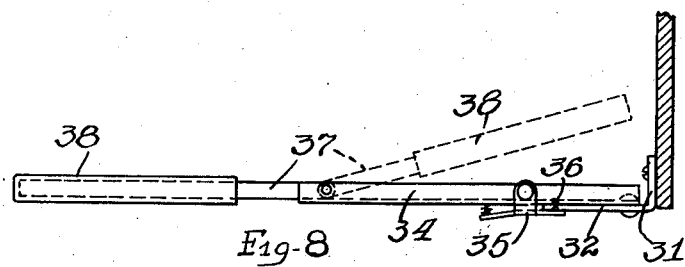

Patented Jan. 1, 1935

1,986,555

UNITED STATES PATENT OFFICE 1,986,555

KNEE REST

Elmer E. Carlson, Woodstock, Ill.

Application October 30, 1933, Serial No. 695,741

3 Claims. (Cl. 155—165)

In driving vehicles, particularly for long distances, it has been found that the driver's right leg is subjected to considerable and continued usage particularly at the knee. To overcome the cause of a driver's right knee becoming tired during the driving of a vehicle, the present invention has been devised to afford a simplified and improved type of adjustable knee rest, which may be conveniently installed at the driver's position in a vehicle to afford a suitable and convenient, adjustable knee rest against which the right knee of a driver may be engaged to relieve the tension and strain on the driver's right leg, and greatly obviating the tendency of the driver's leg from becoming too tired during long trips.

It is an object of this invention to provide a simplified and improved knee rest for automobiles and other vehicles to make driving more convenient and less of a strain upon the knee of the right leg of the driver of a vehicle.

It is also an object of this invention to provide a knee rest for mounting in a convenient position in a vehicle and having means whereby the knee rest may be adjusted for the knees of different drivers.

It is furthermore an object of this invention to provide a knee rest for a vehicle, said knee rest having the pad portion thereof adjustably mounted in a suitable supporting bracket to permit the knee pad to be conveniently disposed to suit the convenient use by different drivers.

It is an important object of this invention to provide an improved and simplified form of a knee rest adapted to be mounted in a convenient position to relieve the knee and leg of an operator from undue strain when the leg of an operator is used for controlling the driving of a vehicle, a machine, or other type of instrument.

Other and further important objects of this invention will be apparent from the disclosures in the specification and the accompanying drawings.

The invention (in a preferred form) is illustrated in the drawings and hereinafter more fully described.

On the drawings:

Figure 5 is a vertical elevational view of a modified form of knee rest.

Figure 6 is another vertical view of the knee rest illustrated in Figure 5.

Figure 7 is a top plan view of another modified form of knee rest adapted to be mounted in substantially a horizontal position.

Figure 8 is a side view of the knee rest illustrated in Figure 7 showing the operation in dotted lines.

As shown on the drawings:

Figure 1:
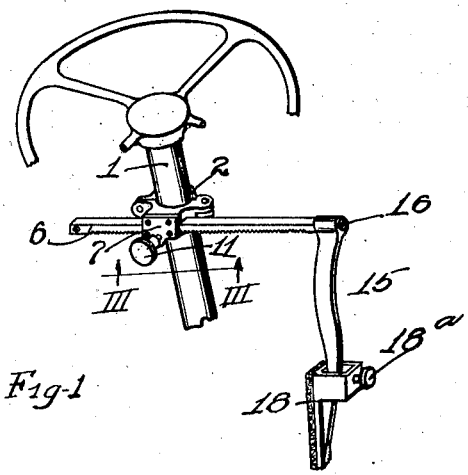
Figure 1 is a fragmentary perspective view of a vehicle steering post and wheel with the steering post having mounted thereon an improved knee rest embodying the principles of this invention.
Figure 2:
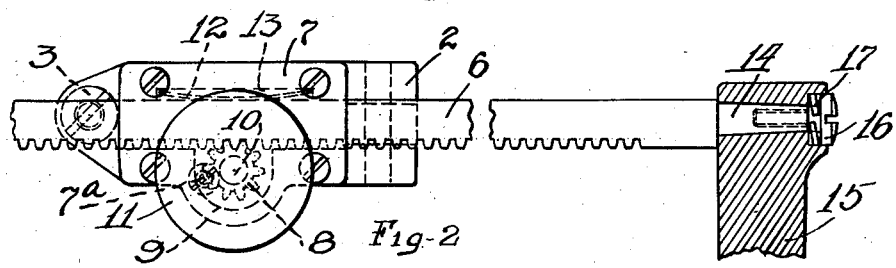
Figure 2 is an enlarged fragmentary front view of the knee rest removed from the steering post and having parts shown in section.
Figure 3:
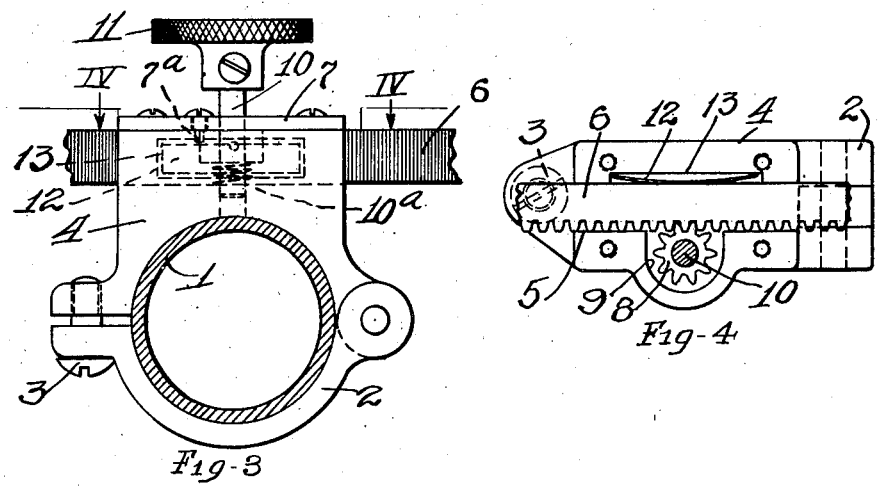
Figure 3 is an enlarged fragmentary sectional view of the knee rest taken on line III—III of Figure 1.
Figure 4:
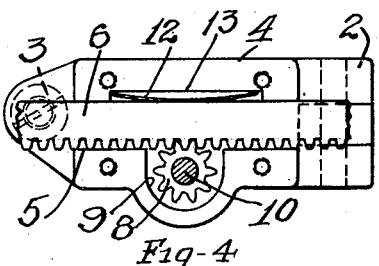
Figure 4 is a fragmentary detail view taken on line IV—IV of Figure 3.

As illustrated in Figure 1, the reference numeral 1 indicates a vehicle steering post having rigidly clamped thereon an improved knee rest embodying the principles of this invention. The knee rest illustrated in Figures 1 to 4 inclusive embodies a clamping bracket 2 comprising a pair of clamping members for engagement around the steering post 1. The clamping members are adapted to be secured in position on the steering post by means of a clamping screw 3 or other suitable means. Integrally formed on one of the members forming the mounting clamp is a block or housing 4 having a groove 5 formed therein in which a rack bar 6 is slidably seated. The rack bar 6 is retained in position by means of a closure plate 7. As clearly illustrated in Figure 4, a pinion 8 is mounted in a recess 9 cut in the clamp block 4. The pinion 8 is in mesh with the teeth of the rack bar 6 whereby slidable adjustment of the rack bar may be obtained when the pinion is rotated. The pinion 8 is supported on a stub-shaft 10 which is rotatably supported and projects through the closure plate 7 and has a knob or handle 11 removably secured on the outer end thereof. A coiled spring $10^a$ is engaged around the inner end of the stub shaft 10 and normally acts to hold the pinion projected outwardly toward the closure plate 7 into normal locked engagement with a latch pin $7^a$ mounted on the plate 7. With this latching arrangement the rack 6 is held in a set position of adjustment. When it is desired to adjust the rack, it is only necessary to push inwardly on the knob 11 against the action of the spring $10^a$ to move the teeth of pinion 8 out of locking engagement with the pin $7^a$ allowing the pinion 8 to be rotated to shift the rack 6. As clearly illustrated in Figure 4, an anti-rattle strap spring 12 is seated in a recess 13 provided in the block 4.

One end of the rack bar 6 is provided with a round tapered shaft or spindle 14 on which an arm 15 is rotatably supported. A retaining or setscrew 16 projects into the threaded end of the shaft 14 and has engaged thereon a spring washer 17 for frictionally holding the arm 15 in a set position of adjustment with respect to the rack bar 6. Slidably mounted on the free end of the adjustable arm 15 is a padded knee rest member 18 which is adapted to be positioned for the convenient resting of a person's knee against the same during the driving of the vehicle of which the steering post 1 forms a part. A set-screw 18a is provided for holding the padded knee rest member 18 locked in an adjusted position on the arm 15.

Figures 5 and 6 illustrate a modified form of knee rest of a type adapted to be mounted on a floor or horizontal support. This type of knee rest comprises a supporting bracket 19 secured to the floor by means of screws or other suitable means. Pivotally mounted on upright arms of the base bracket 19 is an auxiliary bracket 20 having an extension plate 21 provided with a semi-circular row of apertures 22. A strap spring 23 is secured in the base bracket 19 and has the ends thereof co-acting with the auxiliary bracket 20 to hold the same in either a vertical or a horizontal position. Pivotally supported on the extension plate 21 of the auxiliary bracket 20 is the lower end of a supporting bar or standard 24 having pivotally supported thereon a spring controlled finger piece or latch member 25 which carries a latching pin 26 for removable engagement in any one of the apertures 22 for holding the bar 24 locked in a set position of adjustment with respect to the auxiliary bracket. A swinging adjustment of the supporting bar 24 is permitted when the spring controlled latch member 25 is released to disengage the locking pin 26 from engagement with one of the apertures in the auxiliary bracket 21. When the bar 24 is properly positioned, the latch member 25 is released permitting the latching pin to engage in one of the apertures 22 to hold the bar in the desired position.

Slidably mounted on the upper end of the supporting bar 24 is a knee rest member 27. Pivotally supported on the lower end of the knee rest member 27 is a spring controlled latch member 28 which carries a latching pin 29 adapted to be engaged in any one of a plurality of apertures 30 provided in the upper portion of the supporting bar 24. It will be noted that the knee rest member 27 may be very easily raised or lowered on the supporting bar 24 to provide a vertical adjustment of the knee rest. If it is desired to swing both the knee rest and the supporting bar 24 through an arc, the adjustment may be accomplished by releasing the locking pin 26 from engagement with one of the apertures 22 in the auxiliary base bracket 21. In addition to the above referred to adjustment, the knee rest may be swung pivotally into a horizontal position. With the various adjustments, it will be noted that a substantially universal adjustment of the knee rest member may be obtained.

Figures 7 and 8 illustrate another modified form of knee rest mechanism, arranged to be supported on a vertical support such as the instrument board or panel of a vehicle. In this form of the device, the reference numeral 31 indicates a supporting or base bracket having an outwardly projecting flange or extension 32 having an arc shaped row of apertures 33 provided therein. Pivotally supported on the extension plate 32 is one end of a channel bar or supporting member 34. Pivotally mounted on the supporting bar 34 is a spring controlled finger operated latching bracket 35 which carries a locking pin 36 which is adapted to be projected into any one of the apertures 33 to hold the supporting bar 34 in a set position of adjustment with respect to the mounting bracket. Pivotally engaged in the outer end of the supporting bar 34 is an extension arm 37 which when not in use is adapted to be swung upwardly into the dotted line out-of-the-way position illustrated in Figure 8. Frictionally engaged on the pivoted extension arm 37 is a knee rest member or sleeve 38 which may be slidably adjusted on the extension arm 37 so that the knee rest member may be properly positioned for use.

It will be noted that the various forms of the knee rest mechanisms are adapted for various mountings in a motor vehicle or adjacent a machine or instrument which is operated or controlled by the leg of an operator. With the knee rest unit in position, the operator may readily adjust the same into a convenient position to permit the knee to be rested against the knee rest pad whereby an operator's leg or knee will not become tired out or stiff as quickly as heretofore without the use of the improved knee rest mechanism.

It will, of course, be understood that various details of construction may be varied through a wide range without departing from the principles of this invention, and it is therefore not the purpose to limit the patent granted hereon otherwise than necessitated by the scope of the oppended claims.

I claim as my invention:

1. An automobile driver's knee rest device, adapted for mounting on the automobile steering post, and comprising a clamping bracket having a passaged housing thereon, a rack bar projecting therethrough, a pinion in said housing meshing with the rack bar, means connected with the pinion for rotating the same to move the rack bar through the housing, spring means frictionally holding an arm supported on the rack bar, a knee rest member slidably mounted on said arm, and means for holding the knee rest member locked in an adjusted position on the arm.

2. An automobile driver's knee rest device, adapted for mounting on the automobile steering post, and comprising a clamping bracket having a passaged housing thereon, a rack bar shiftably engaged in the housing, a pinion in the housing in mesh with the rack bar, latch means for normally holding the pinion locked against rotation, means for releasing the pinion from engagement with the latch means and for rotating the pinion to move the rack bar through the housing, spring means frictionally holding an arm pivotally supported on the rack bar, a knee rest member slidably supported on said arm, and means for holding the knee rest member locked in an adjusted position on said arm.

3. An automobile driver's knee rest device, comprising a mounting bracket, a passaged housing thereon, a rack bar projecting through the housing, spring means in the housing and engaging the rack bar to hold the same against rattling, a pinion shiftably and rotatably engaged in the housing and in mesh with the rack bar, a latch means for normally holding the pinion locked against rotation, means for shifting the pinion out of engagement with the latch means and for rotating the pinion to move the rack bar through the housing, spring means frictionally holding an arm pivotally supported on the rack bar, a knee rest member adjustable on said arm, and means for locking the knee rest member in an adjusted position on said arm.

ELMER E. CARLSON.